(No Model.) 3 Sheets—Sheet 1.

J. M. BRYAN.
FISHING REEL.

No. 278,867. Patented June 5, 1883.

WITNESSES:
W. W. Hollingsworth
A. G. Syme

INVENTOR:
James M. Bryan
BY Mann & Co.
ATTORNEYS.

(No Model.) 3 Sheets—Sheet 2.
J. M. BRYAN.
FISHING REEL.
No. 278,867. Patented June 5, 1883.
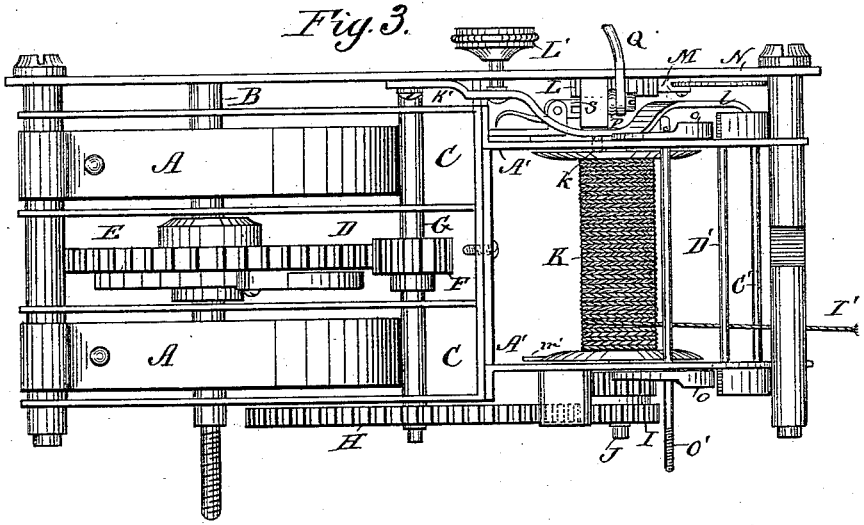
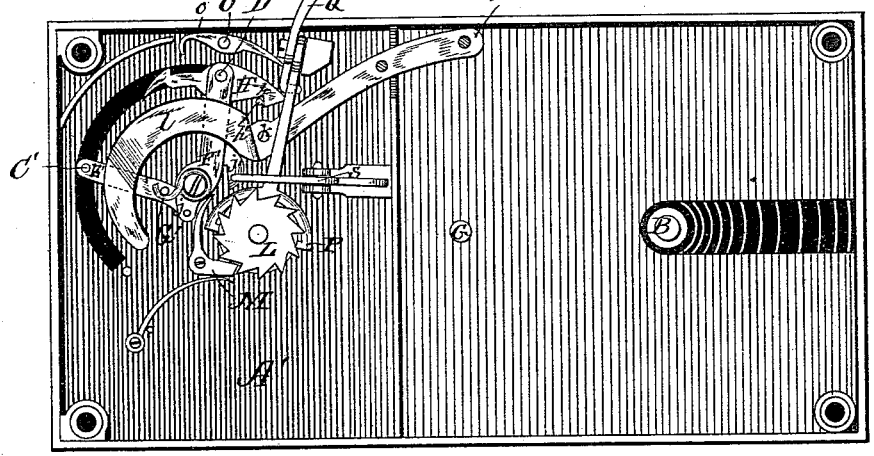
WITNESSES:
W. W. Hollingsworth
A. G. Syne.
INVENTOR:
James M. Bryan
BY Munn
ATTORNEYS.

(No Model.) 3 Sheets—Sheet 3.
J. M. BRYAN.
FISHING REEL.
No. 278,867. Patented June 5, 1883.
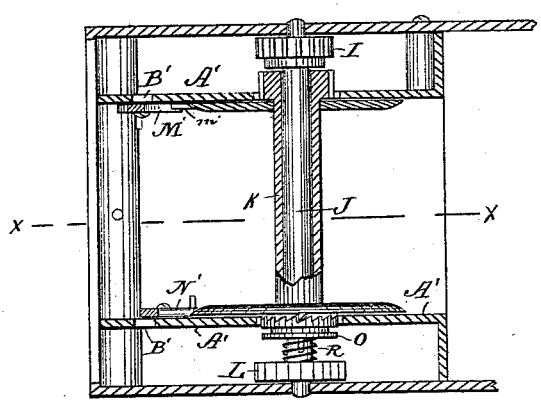
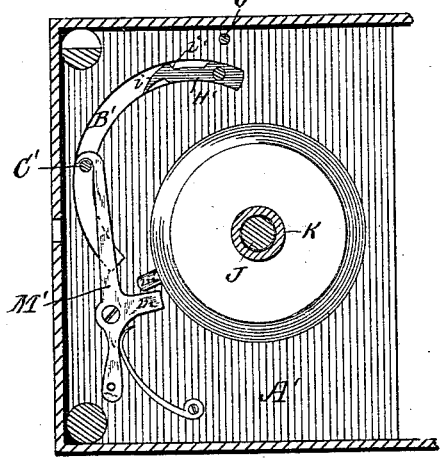 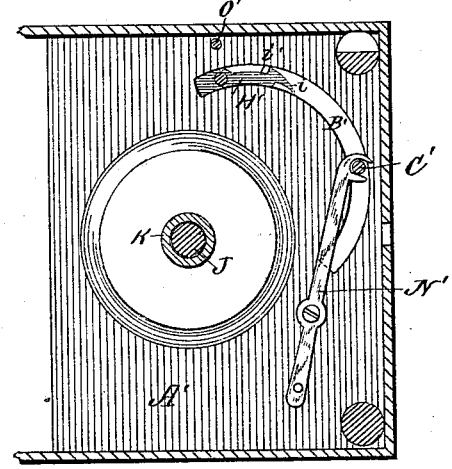
WITNESSES:
INVENTOR:
James M. Bryan
BY
ATTORNEYS.

UNITED STATES PATENT OFFICE.

JAMES M. BRYAN, OF GUTHRIE, KENTUCKY.

FISHING-REEL.

SPECIFICATION forming part of Letters Patent No. 278,867, dated June 5, 1883.

Application filed March 24, 1883. (No model.)

*To all whom it may concern:*

Be it known that I, JAMES M. BRYAN, of Guthrie, in the county of Todd and State of Kentucky, have invented a new and useful Improvement in Fishing-Reels, of which the following is a full, clear, and exact description, reference being had to the annexed drawings, forming part of this specification.

This invention relates to fishing-reels which are provided with mechanism whereby a fish on the hook may cause the line to be wound on the reel automatically without the aid or presence of the fisherman; and the invention consists of the novel construction hereinafter described and claimed.

Figure 1:
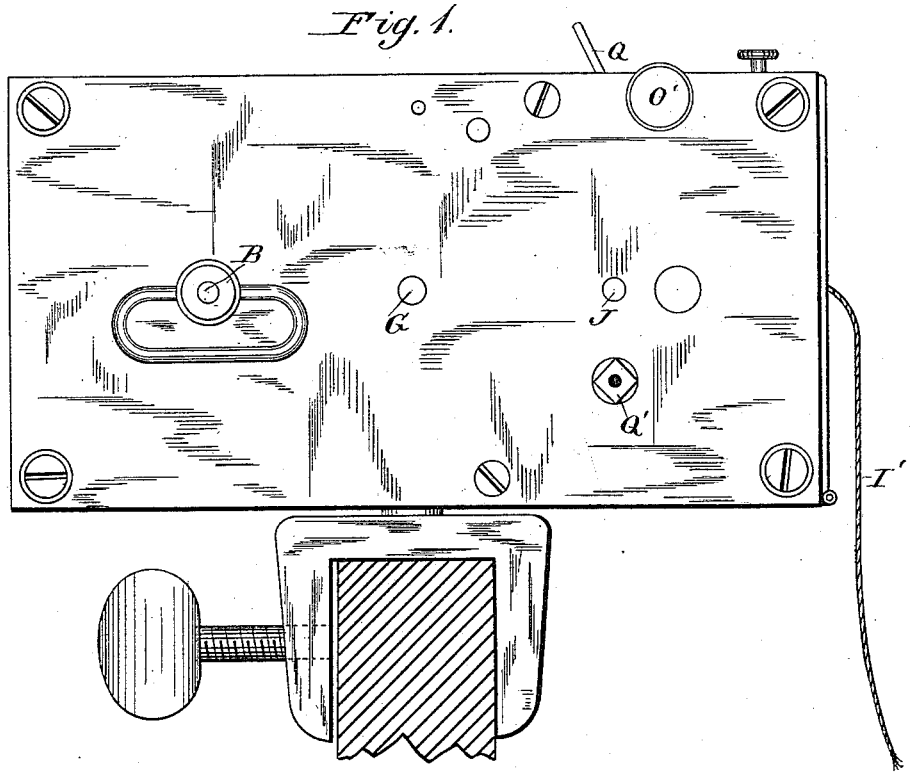
Figure 2:
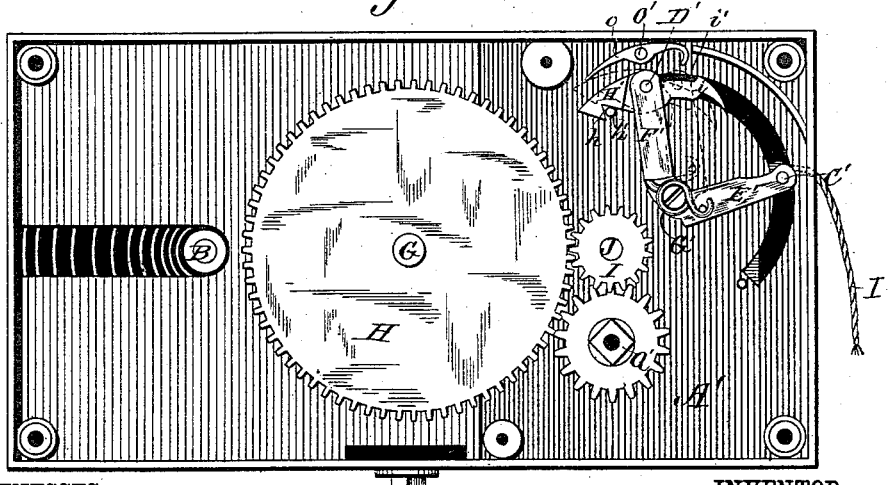

In the drawings, Figure 1 is a side elevation of my improved fishing-reel. Fig. 2 is a side elevation, showing the right-hand cap-plate removed. Fig. 3 is a plan view with the casing removed. Fig. 4 is a side elevation, showing the left-hand cap-plate removed. Fig. 5 is a horizontal section, partly broken away; and Figs. 6 and 7 are sections on line $x\,x$ of Fig. 5, looking in opposite directions.

In carrying my invention into effect I prefer to use an ordinary clock-spring, A, for the sake of economy of space, but may use any other suitable power, and in order to balance the friction on the spring-shaft I provide the spring-shaft B with two such springs, arranged side by side, in compartments C C. In an intermediate compartment, D, is a gear-wheel, E, loosely mounted on the shaft B, and connected therewith by means of a pawl and ratchet in a well-known manner. The gear E engages with a pinion, F, on a shaft, G, supported in the frame-work of the device, which shaft is provided with a gear, H, engaging with a pinion, I, rigidly secured to the shaft J, upon which the reel-spool K is loosely mounted.

On the shaft J, at the opposite end from that carrying the pinion I, is a ratchet, L, which is adapted to be held by a pawl, M, pivoted to the plate N, forming a part of the outer casing. The shaft J is also provided with a sliding clutch, O, which is adapted to engage with a corresponding clutch on the spool K.

The clutch O is provided with a fork, P, which is pivoted to a lever, Q, having a finger adapted to engage with the fork and move the clutch, when the free end of the lever, which projects through the casing, is properly moved. A coil-spring, R, is arranged on the shaft J for holding the clutch O normally in engagement with the spool K, and the clutch-fork P is placed in engagement with a spring-actuated arm, S, the object of which will be hereinafter described.

The spool K is journaled between two plates, A', having segmental slots B' formed therein, and in the slots are arranged two cross-rods, C' D', which are connected, respectively, to two pairs of arms, E' F', arranged on the outer side of the plates A', and pivoted together on common supporting-pins.

On each pin is arranged a coil-spring, G', the ends of which are attached to the arms E' F' in such manner as to draw the arms E' F', and through them the cross-rods C' D', toward each other. To the upper ends of the arms F' are pivoted catches H', having notches $h$, adapted to engage with projections $h'$ on the outer surface of the plates A' to hold the cross-rod D' in the extreme upper ends of the slots B'.

The catches H' are provided at their front ends with cams $i$, over which the projecting ends of the rod C' may pass to depress the catches and release them from the projections $h'$, and behind the said cams are notches $i'$, into which the ends of the rod C' will slip, and by which the rod D' may be drawn down in the slots B' when the rod C' is afterward drawn down by the tension on the line I', which rests on said rod. The lower end of the arm F' on that side of the spool K at which the ratchet L is placed is provided with a laterally-projecting pin, $j$, which is adapted to bear against the tail of pawl M, so that when the cross-rod D' is moved downward the pawl M will be disengaged from the ratchet L and the tension of the clock-springs will cause the spool-shaft to rotate to wind the line.

The arm F' at a point above the pin $j$ is provided with a projection, $j'$, which is adapted to engage with the spring-actuated arm S, and thereby disengage the clutch O from the spool when the cross-rod D' is in the upper ends of the slots B'. When the rod D' is moved downward the clutch is allowed to spring into contact with the spool, and at the same time the pawl is disengaged from the ratchet L, as just stated.

To the plate N is secured a tensioning device for the spool, consisting of the bent spring K', having a projection, $k$, adapted to rest against one of the flanges of the spool through an opening in the adjacent plate A', and in the plate N is a thumb-screw, L', having its end connected to the spring K', so that by operating the screw the projection $k$ may be made to bear against the flange of the spool, when desired. The bent spring K' is provided with an outward bend, $l$, corresponding to the raised position of the arms E' F', in which bend the said arms are accommodated. The front end of the spring K' is curved inward toward the adjacent plate A', in order that when the cross-rods C' D' are pressed down in the slots B' the arms E' F' will come in contact with the spring, and by pressing it outward release the spool from the tension exerted thereby.

To the inner surfaces of the plates A' are pivoted two catches, M' N', adapted to be placed in engagement with the cross-rod C', for purposes yet to be explained. Above the spool in the plates A' is journaled a shaft, O', having a knob, which is to project without the casing, and on this shaft are secured two curved cross-pieces, $o$, located above the upper ends of the arms E' F', and adapted to assist in placing the catches on the arms F' in engagement with the projections $h'$, and also for separating the said arms in setting the reel, as will be more fully explained hereinafter. A crank is to be secured to a shaft, Q', having a pinion engaging with a pinion on the shaft J, whereby the reel may be operated by hand, when desired.

Having now described the mechanism of my invention, I will proceed to explain its operation.

The line is passed between the cross-rods C' D', so that a tension thereon will cause the rod C' to be moved down in the slots B', and the rod C' is connected to the rod D' by the catches H', so that both the said rods will be moved down together. When the rods C' D' are thus moved down, the arms E' F' come in contact with the spring K', and release the spool from tension, whereupon the clock-springs cause the spool to wind the line, the tension put upon the line by the fish serving to hold the cross-rods down in position for keeping the tensioning device out of contact with the spool. The tensioning device is to be regulated according to the nature of the water to prevent a current, for instance, from operating the cross-rods, by putting a tension on the line. The reel is set as above described when the object is to catch the kinds of fish which keep near the bottom of the stream, and which are disposed to swallow the bait instantly. The first pull on the line in such case indicates that the bait has been swallowed, and consequently, by setting the device as above described, the line will be brought in immediately after the first pull, and the fish will be landed. Other kinds of fish, however, require to be taken near the surface of the water or while moving about. These are in the habit of first seizing the bait and darting through the water with it and afterward stopping and swallowing it. In fishing for these, therefore, it is necessary to set the reel so that two pulls may be made on the line before the same shall be wound on the spool. To set the reel for "surface-fishing," then, the knob on the shaft O' is to be turned forward to cause the catches on the forward end of the cross-pieces $o$ to engage with the upper ends of the arms F' to hold said arms while the cross-rod C' is disengaged from the catches H'. Through an opening in the end of the casing, which is provided with a door having a slot through which the line passes, the finger is to be inserted to press the cross-rod D' back into the upper ends of the slots B' while the rod C' is held down. When the rod D' is in position, by turning the shaft O' backward the rear ends of the cross-pieces $o$ will press the catches H' down into engagement with the projections $h'$ to hold the cross-rod D' in such position.

As before stated, there is a projection, $j'$, on the arm F', which is adapted to engage with the arm S and hold the clutch O out of engagement with the spool when the cross-rod D' is held in the upper ends of the slots B'. The object of thus setting the cross-rod D' is to hold the clutch out of engagement with the spool, so that the latter shall have free independent movement, to allow the line to pay out when the fish runs with the bait. To hold the cross-rod C' down and prevent it from returning to the rod D' under the action of the springs G', it is placed in engagement with the hook or catch M'. This catch is provided with a heel, $m$, against which a projection, $m'$, on the adjacent flange of the spool will strike and thereby cause the said catch to release the rod C' when the spool is rotated by the action of drawing out the line on the first pull. As the fish runs with the bait the line pays out to any required extent, and the tension on the line holds the rod C' down after the catch M' is disengaged, until the fish stops to swallow the bait. When he stops the tension of the springs G' will cause the rod C' to return to the rod D' and engage with the catches H', in which movement the cams $i$ are depressed to release the catches H' from the projections $h'$. The fish then swallows the bait and pulls on the line the second time, causing both the cross-rods C' D' to descend together, as in "bottom-fishing" already described. As the rod D' descends under the tension on the line the clutch is allowed to return into engagement with the spool, and the projection or pin $j$ on the arm F' forces the pawl M out of engagement with the ratchet L, and allows the clock-springs to wind in the line and land the fish.

When it is desired to operate the spool by hand for any purpose, the rod D' is to be set in the upper ends of the slots B', in the maner already described for holding the clutch out of engagement with the spool, and the rod C' is to be pressed down in the slots B' and placed in engagement with the catch N' to prevent it from returning to rod D' and releasing the same. The line may then be drawn out by hand and wound back by the crank P'.

What I claim is—

1. The combination, with a reel-spool and spring-actuated gearing connected therewith, of the devices C' D', connected together by coil-springs, and adapted to be set independently, and means for tripping the said devices through the tension put upon the line by a fish, substantially as shown and described.

2. The combination, with the spool, and the spring-actuated gearing connected therewith, of the tensioning device for holding the spool yieldingly, the devices C' D', adapted to be set independently and having means for ungearing and gearing the spool, and for releasing the spring-actuated gearing, and disengaging the tensioning device, substantially as shown and described.

3. The combination, with the spool and the spring-actuated gearing connected therewith, of a clutch adapted to gear the spool with its shaft, and a lever for operating the clutch to assist in setting the device D', substantially as shown and described.

4. The combination, with the spool and the spring-actuated gearing connected therewith, of the devices C' D', adapted to be set independently, and the shaft O', having means for assisting in setting the said devices, substantially as shown and described.

JAMES M. BRYAN.

Witnesses:
A. G. LYNE,
SOLON C. KEMON.